United States Patent

[11] 3,600,880

| [72] | Inventor | Grover L. Woods<br>P.O. Box 5612, Greenville, S.C. 29606 |
|---|---|---|
| [21] | Appl. No. | 861,878 |
| [22] | Filed | Sept. 29, 1969 |
| [45] | Patented | Aug. 24, 1971 |

[54] MOWER GUARD
1 Claim, 4 Drawing Figs.

[52] U.S. Cl. .................................................. 56/298, 56/308
[51] Int. Cl. ..................................................... A01d 55/02
[50] Field of Search ......................................... 56/296–298, 307–311, 304, 306

[56] References Cited
UNITED STATES PATENTS

| 1,746 | 8/1864 | Weeks | 56/298 X |
| 741,642 | 10/1903 | Evans | 56/298 |
| 778,404 | 12/1904 | Cook | 56/298 |
| 888,491 | 5/1908 | Hampton | 56/298 |
| 1,789,781 | 1/1931 | Seidel | 56/309 |

*Primary Examiner*—Louis G. Mancene
*Assistant Examiner*—J. A. Oliff
*Attorney*—Bailey & Dority

ABSTRACT: A cutting apparatus for a mower including an elongated guardrail, and a plurality of cast-iron guards mounted thereon. A plurality of aligned knives are attached to a sickle bar and have their cutting edges alternately facing up and down. Each of the guards has a horizontal slot with a recess provided in opposed sides above and below the slot. A casehardened rectangular plate is carried above the slot on one side of the guard and below the slot on the other side of the guard for providing a cutting surface for the knives.

PATENTED AUG 24 1971
3,600,880
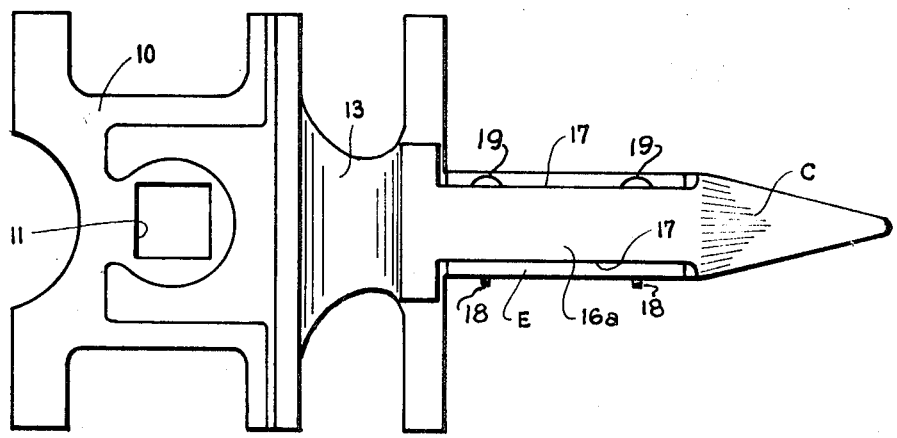
Fig. 1.
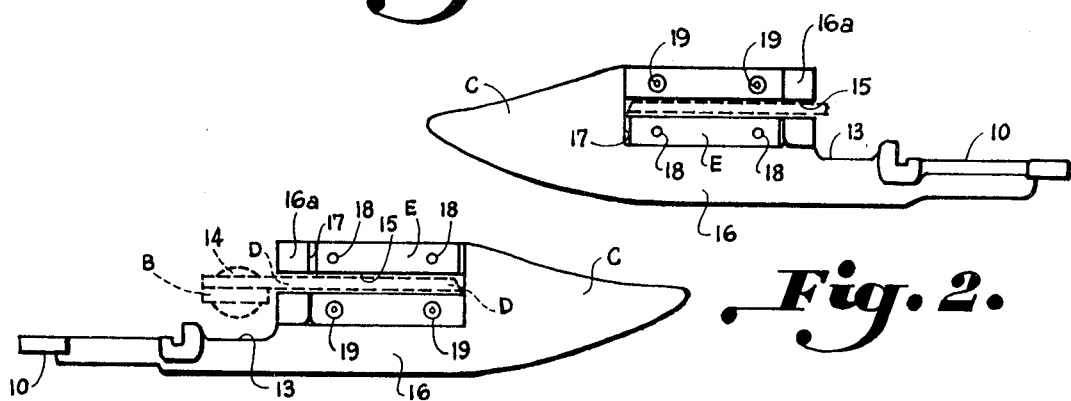
Fig. 2.
Fig. 3.
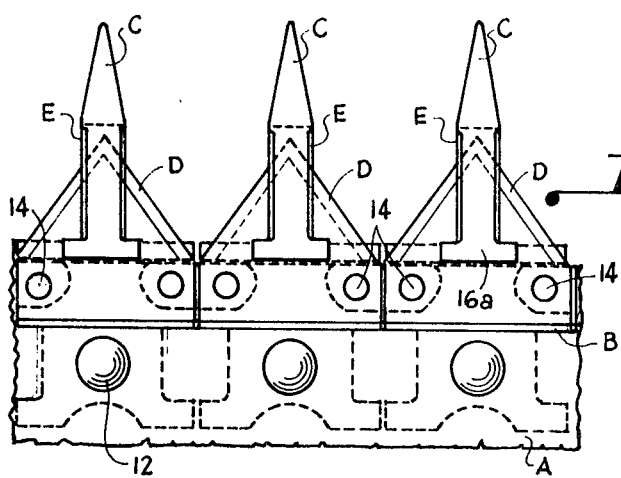
Fig. 4.
INVENTOR.
GROVER L. WOODS
BY
Bailey + Dority
ATTORNEY

MOWER GUARD

This invention relates to knife or sickle guards for mowers, and more particularly to an improved cutting apparatus.

Heretofore, normally mowers included a plurality of knives each of which had a cutting surface facing in one direction so that as the knives were oscillated they would shear grass and the like against the guard. This shearing action would, in turn, cause an upward thrust of the knives. In order to prevent the gap between the knife and the ledger portion of the guard from becoming too great, holddown clips were used to press downwardly against the knives. This, in turn, caused the knives to wear, as well as required more power to oscillate the knives back and forth.

It is noted that in U.S. Pat. No. 778,404, granted to Cook on Dec. 27, 1904, it was proposed that in order to equalize the cut, the knives were arranged alternately with the cutting edges thereof facing upwardly and downwardly, respectively. According to the patent this provided a more balanced cutting action.

Not only is the subject invention concerned with providing a more balanced cutting action, it is concerned with providing a cutting plate which can be readily rotated to produce a clean severing action.

Accordingly, it is an important object of the present invention to provide a guard for a mower which produces a balanced cutting operation, as well as capable of maintaining a sharp or clean cutting surface.

Another important object of the present invention is to provide a mower guard which can be readily manufactured and easily maintained in the most effective cutting state.

The construction designed to carry out the invention will be hereinafter described, together with other features thereof.

The invention will be more readily understood from a reading of the following specification, and by reference to the accompanying drawing forming a part thereof, wherein an example of the invention is shown and wherein:

FIG. 1 is a plan view of a mower guard constructed in accordance with the present invention, FIG. 2 is a side elevational view of the mower guard, FIG. 3 is a side elevational view taken from the opposite side of the guard from that shown in FIG. 2, and FIG. 4 is an enlarged fragmentary plan view illustrating a portion of a sickle bar and guards employing the invention.

The drawing illustrates a cutting apparatus for mowers comprising an elongated guardrail A, a sickle bar B, and a plurality of cast-iron guards C. A plurality of aligned knives D are attached to the sickle bar B each of the knives having cutting edges facing in one direction with the cutting edges of alternate knives facing in opposite directions. The guards have a flat rear portion attached to the guardrail A, and an intermediate recess in which the sickle bar B is positioned. The guards have a forwardly extending main body portion which terminates in a substantial point. Each of the guards C has a horizontal slot for accommodating knives D. A recess is provided in opposed sides of said guards C above and below the horizontal slot. A casehardened rectangular plate E is carried above the slot on one side of the guards and below the slot on the opposite side of the guard C for providing a cutting surface for said knives D. Each of the plates E are adapted to be rotated and turned for providing four cutting edges.

The guardrail A is a conventional guardrail, and only a portion of such is illustrated to show the cooperation with the guard. The rear portion 10 of the guard is substantially horizontal and has an opening 11 therein, through which a bolt 12 passes to secure the guard to the guardrail A. The guard C also has a recess 13 for accommodating the sickle bar B. It is noted that the knives D attached to the sickle bar B by rivets 14 are alternately inverted so as to produce a balanced cutting action.

Each of the guards C has a horizontal slot 15 in a main body portion 16 defined by an overhanging lip 16a and a lower portion of the main body 16 for accommodating the knives D. A recess 17 is provided in the sidewalls of the guard C both above and below the slot 15. These recesses are provided for accommodating the cutting plates E. It is noted that the cutting plates are positioned above the slot 15 on one side of a particular guard and below the slot 15 on the opposite side of the guard. This is to provide a clean, sharp cutting surface for severing the grass or grain being mowed between the sharp cutting edge of a knife D and the particular plate.

When the sharp cutting edge of a knife is facing downwardly the plate for that particular guard should be positioned below the horizontal slot for severing the grass as the sickle bar is oscillated back and forth. Since the adjacent knife D is facing upwardly, then on the opposite side of the guard the plate is positioned above the slot for severing the grass as the knife D oscillates into the horizontal slot. Normally, the knives D oscillate between slots 15 in adjacent guards C, therefore, the guards are mounted on the guardrail A in successive pairs. This is to allow the sharp cutting edge of a knife E to enter a slot bearing against a plate E. In other words, the plate E is mounted above the slot 15 on the right-hand side of a guard and below the slot 15 on the left-hand side of the guard. The exact opposite is true for the positioning of the plates E on the adjacent guards D.

The plates E have threaded holes therein for receiving a threaded bolt 18 which extends through the guardrail and has an enlarged head 19 on the opposite side. Each of the plates E is rectangular in shape possessing four sharp right-angled corners. During the mowing operation the action of the knife D severing thereagainst eventually dulls the outermost edge. When this happens the bolts 18 are unscrewed and the plates E are rotated and turned when necessary, so that there are four separate cutting edges that may be used.

By using casehardened plates E the remainder of the guard can be made of cast iron. The combination of the casehardened plates and balanced cutting action of the knives produces an effective and efficient cutting operation.

What is claimed is:

1. A cutting apparatus for mowers comprising an elongated guardrails, a sickle bar, and a plurality of cast-iron guards, a plurality of aligned knives attached to said sickle bar, some of said knives having cutting edges facing upwardly with the cutting edges of their next adjacent knives facing downwardly, said guards having a flat rear portion attached to said guardrail and an intermediate recess in which said sickle bar is positioned, said guards having a forwardly extending main body portion that terminates in a substantial point, the improvement comprising: each of said guards having a horizontal slot for accommodating said knives, a recess provided in each of the opposed laterally spaced sides of said guards, one of said recesses being provided above said horizontal slot and the other of said recesses being provided below said horizontal slot, a casehardened rectangular plate carried above said slot on one side of said guards and a casehardened rectangular plate carried below said slot on the opposite side of said guard for providing cutting surfaces for said knives, said rectangular plates being carried in said recesses flush against the side of said guards, and each of said plates adapted to be rotated for providing four cutting edges.